United States Patent Office 2,856,801
Patented Oct. 21, 1958

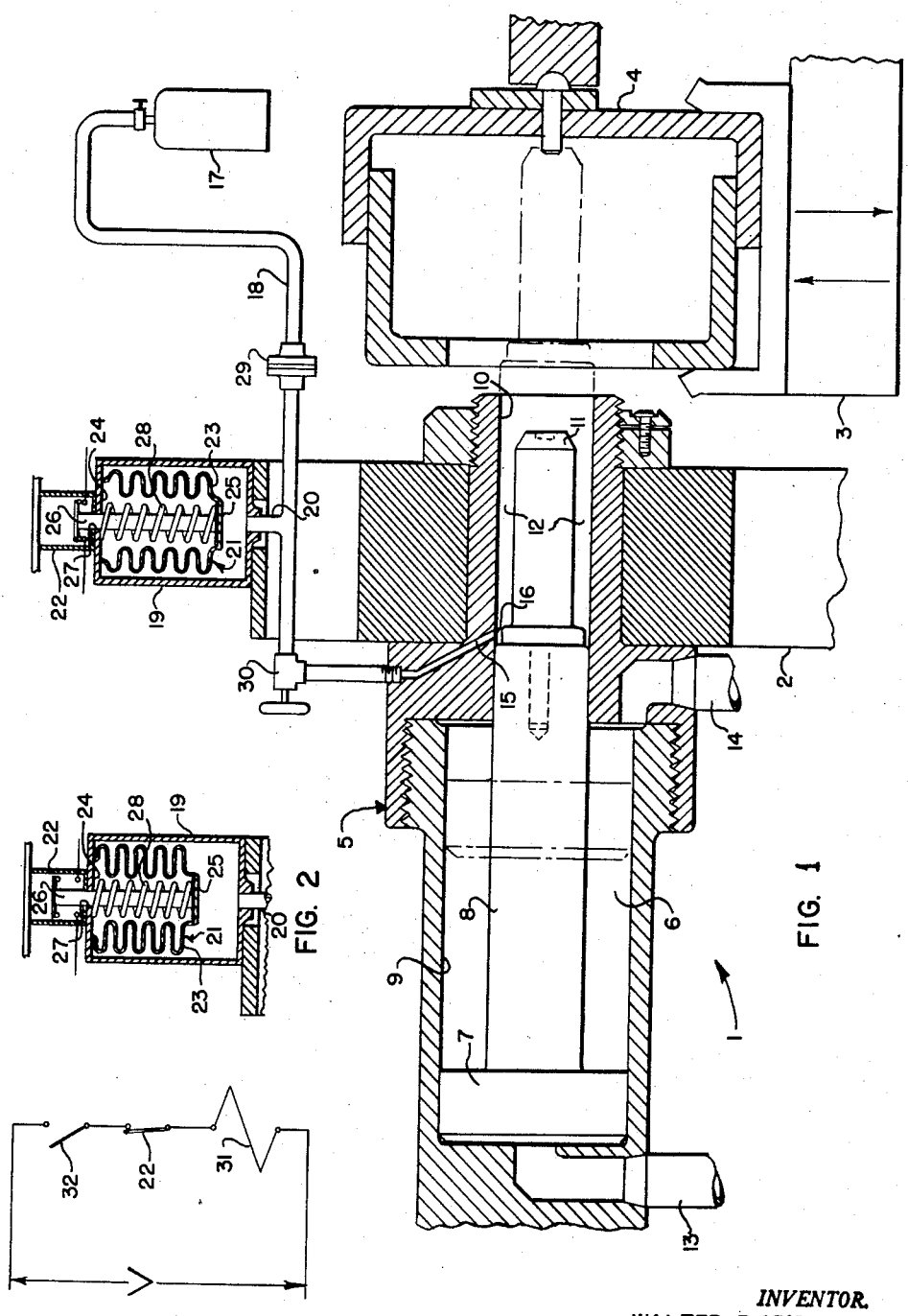

2,856,801

INTERLOCK BETWEEN TOOL AND WORK INDEX

Walter R. Griswold, Chicago, Ill., assignor to A. O. Smith Corporation, Milwaukee, Wis., a corporation of New York Application October 7, 1957, Serial No. 688,738

5 Claims. (Cl. 78—46)

This invention relates to apparatus for controlling the withdrawal of a workpiece in response to the retraction of a tool.

In many automatic machine operations, it has been the practice to advance and retract a tool in timed relation with the conveying means for carrying a workpiece into and out of the work position. When the tool functions properly according to a prearranged schedule, such operations can be highly successful. If for any reason, however, the tool fails to retract according to schedule and move clear of the workpiece before the conveying means proceeds to withdraw the workpiece from the work position, great damage may result to the workpiece, tool, and/or conveying means. And when the tool represents but one station on an assembly line, such an accident may disrupt or result in downtime for the whole line.

The invention is particularly well adapted for use on a machine tool wherein the tool reciprocates during its work cycle and wherein accessability to the working parts is relatively limited. The machine tool is employed in conjunction with conveying means which are adapted to carry the workpiece into the work position and to withdraw same after the work is completed. With the workpiece disposed in the work position, the tool and its carrier are slidably advanced within an open-ended housing to engage the workpiece and perform the designated tool function. Thereafter the tool and carrier are retracted within the housing, and the workpiece is withdrawn from the work position. To insure that the tool will be retracted clear of the workpiece prior to the withdrawal of the workpiece from the work position, the invention provides apparatus whereby withdrawal of the workpiece is conditioned or made dependent on retraction of the tool.

According to the invention, a pressure responsive assembly associated with the tool is adapted to actuate interlock switch means controlling the withdrawal of the conveying means together with the workpiece after the tool has been retracted. To carry out the invention, a passage extends through the tool housing wall to provide an outlet port within the housing which is covered when the tool is advanced and uncovered when the tool is retracted. The passage is connected to a source of air pressure through a pressure line, and a pressure chamber communicates with the line between the pressure source and outlet port. The pressure responsive assembly is mounted within the pressure chamber and is adapted to actuate a switch which controls the drive means for the conveying means carrying the workpiece. When the tool is extended or advanced to engage the workpiece, the outlet port within the housing is covered so that the chamber becomes pressurized, and the pressure responsive assembly sets the switch in a position to prevent withdrawal of the workpiece. When the tool is retracted to a position clear of the workpiece, it uncovers the outlet port and the pressure in the chamber drops as the air escapes through the port and the pressure responsive assembly actuates the switch which sets the drive means for the conveying means in motion to withdraw the workpiece. Thus the invention provides means assuring that the workpiece will remain in the work position until the tool is retracted to clear the workpiece and prevent any possible interference therebetween.

The accompanying drawing illustrates the best mode presently contemplated for carrying out the invention.

Figure 1 is a sectional view showing the pressure responsive assembly of this invention for controlling the withdrawal of the workpiece with the tool in the retracted position and before withdrawal of the workpiece and showing further in dotted lines the tool in the extended position;

Fig. 2 is a sectional view of the pressure responsive assembly showing the same subject to the force of pressure to hold open the switch controlling withdrawal of the workpiece; and Fig. 3 is a schematic circuit diagram showing the electrical interlock for controlling withdrawal of the workpiece.

Referring to the drawings, the invention is illustrated as being applied to an automatic riveting machine 1 of which only a portion is shown. The machine 1 is mounted to a frame 2 and is disposed oppositely from conveying means 3 actuated by drive means, not shown, to carry a workpiece 4 into and out of the work position. The conveying means 3 may be of the general type shown and described in the patent of Donald W. Sherman, No. 2,804,962, assigned to the common assignee of this invention.

The machine 1 comprises a cylindrical housing 5 having a stepped bore 6. A piston 7 having a forwardly extending rod 8 is slidably disposed for reciprocation within the rearward enlarged bore portion 9 of housing 5. The forward reduced bore portion 10 opens forwardly and slidably receives the rod 8 of piston 7. A riveting tool 11 is mounted on the forward end of rod 8 and has a lesser diameter than bore portion 10 to provide an annular clearance 12 between the wall of bore portion 10 and the tool 11.

The piston 7 is reciprocated within the bore portion 9 to advance and retract the tool 11 by means of hydraulic pressure from a source, not shown, through inlets 13 and 14 provided respectively at the ends of bore portion 9 to either side of the piston. Upon actuation of the piston 7, the reduced bore portion 10 in housing 5 serves to guide the rod 8 and stabilize the tool 11.

According to the invention, a passage 15 extends through the wall of housing 5 to provide an outlet port 16 in the bore portion 10 forwardly of the retracted position of the rod 8 carrying tool 11. The passage 15 communicates with a source of air pressure 17 through the pressure line 18.

A cylindrical housing 19 is mounted on the frame 2 or other suitable support and communicates with the pressure line 18 through the line 20. The pressure responsive assembly 21 disposed in housing 19 is adapted to be actuated in response to pressure within line 18 and in turn actuates the normally closed switch 22 carried outwardly of housing 19.

The pressure responsive assembly 21 within housing 19 comprises a contractible metallic bellows 23 which is secured to the upper wall 24 of the housing and extends downwardly therefrom. The base 25 of the bellows is movable with respect to upper wall 24 in response to pressures in line 18 and is connected to the movable contacts of switch 22 through the rod 26 extending downwardly within the bellows from the switch through the opening 27 of housing 19. A helical spring 28 surrounds the rod 26 and extends between upper wall 24 of the housing 19 and the base 25 of bellows 23 and serves to expand the bellows and close switch 22 when the pressure in line 18 is relieved or dropped.

Means such as an orifice 29 is provided in line 18 adjacent to the pressure source 17 and serves to regulate and control the flow of air from the source into the line 18 and housing 19. The speed of response for opening and closing switch 22 is determined by the amount of pressure drop past the adjustable bleed valve 30 interposed in line 18 between the housing 19 and port 16 to control the speed with which the pressure in the housing is relieved.

The switch 22 serves as an interlock between the tool 11 and the conveying means 3, and as shown in Fig. 3, is disposed in series with the solenoid 31 for operating a valve or other means, not shown, for actuating the brake and clutch of the drive means, not shown, of the conveying means. Switch 22 is further disposed in series with a main control switch 32. The switch 32 is normally open and may be manually or automatically operated to energize the solenoid 31 when the switch 22 is closed.

Prior to the work cycle for tool 11 and when the tool is disposed in its retracted position with the port 16 uncovered, the pressure in line 18 is at or near atmospheric and the bellows 23 extended, as shown in Figure 1, to maintain the switch 22 closed. Upon closure of switch 32, the drive means for conveying means 3 is energized to carry the workpiece 4 into the work position. Thereafter switch 32 is opened to de-energize the solenoid 31. The tool 11 then moves in to perform the work, as shown by the dotted lines in Figure 1, and the rod 8 covers the port 16 to close off pressure line 18 and a pressure is built up in housing 19 to contract the bellows against the pressure of spring 28 and open the switch 22, as shown in Fig. 2. The switch 32 is now closed, but the circuit through solenoid 31 remains broken as long as port 16 in housing 5 is closed by rod 8. Withdrawal of the workpiece 4 is thus effectively prevented while the tool 11 is in its extended position.

Upon completion of its mission, the tool 11 is retracted from the workpiece into the housing 5. After the tool has effectively cleared the workpiece 4, the rod 8 carrying the tool uncovers the port 16 to relieve the pressure in line 18 and housing 19 into the annular clearance 12 around the tool and permits the spring 28 to expand the bellows and close switch 22. With switch 32 already closed, closure of switch 22 energizes the solenoid 31 to effect withdrawal of the workpiece 4 from the work position.

The invention thus provides an effective means for conditioning the withdrawal of the workpiece from the work position upon retraction of the tool clear of the workpiece to prevent possible interference therebetween and which requires a minimum of space in the vicinity of the tool.

Various modes of carrying out the invention are contemplated as being within the scope of the following claims particularly pointing out and distinctly claiming the subject matter which is regarded as the invention.

I claim:

1. In combination, a first member adapted to be moved into a given position and withdrawn therefrom, an open-ended housing disposed adjacent to said given position, a second member disposed slidably within said housing and disposed to reciprocate relative to the housing to an extended position in intersecting relation with said first member and to a retracted position clear of said first member, said housing having a passage through the wall thereof providing a port which is covered and uncovered as the second member is reciprocated, control means operably connected to said first member for moving the same, interlock switch means operably connected to said control means for controlling the withdrawal of said first member from said given position, a pressure responsive assembly in communication with said passage and adapted to operate said switch means, and a source of pressure in communication with said passage and assembly and serving to pressurize the assembly when the port in said housing is covered to set the switch means in a position to prevent withdrawal of said first member while the second member is extended, said port being uncovered upon retraction of the second member clear of the first member to relieve the pressure on said assembly whereby the switch means is set to effect withdrawal of the first member.

2. In combination, conveying means adapted to move a workpiece into a work position and withdraw the workpiece from said position, an open-ended housing disposed adjacent to said work position, a tool carrying member slidably disposed within said housing and being movable relative to the housing to move the tool to an extended position in intersecting relation with the workpiece and to a retracted position clear of the workpiece, said housing having a passage through the wall thereof providing a port which is covered when the tool is in the extended position and uncovered when the tool is retracted clear of the workpiece, control means operably connected to said conveying means to move the same, switch means operably connected in said control means for actuating the control means and controlling the withdrawal of the conveying means together with the workpiece, a pressure line communicating with the passage in said housing, a pressure chamber communicating with the pressure line, a pressure responsive element provided in said chamber and adapted to operate the switch means, and a source of pressure in communication with the pressure line and chamber and serving to pressurize the chamber when the port in said housing is covered to force the pressure responsive element to set the switch means in a position to prevent withdrawal of the workpiece while the tool is extended, said port being uncovered upon retraction of the tool clear of the workpiece to relieve the pressure in the chamber and remove the force on said pressure responsive element whereby the switch means is set to effect withdrawal of the workpiece.

3. In combination, conveying means connected in an electrical circuit and adapted to move a workpiece into a work position and withdraw the workpiece from said position, an open-ended housing disposed adjacent to said work position, a tool carrying member slidably disposed within said housing and being movable relative to the housing to move the tool to an extended position in intersecting relation with the workpiece and to a retracted position clear of the workpiece, said housing having a passage through the wall thereof providing a port which is covered when the tool is in the extended position and uncovered when the tool is retracted clear of the workpiece, normally closed switch means operably connected in said electrical circuit and including a set of movable contacts controlling the withdrawal of the conveying means together with the workpiece, a pressure line communicating with the passage in said housing, a pressure chamber communicating with the pressure line, a movable pressure responsive member provided in said chamber and adapted to move said movable contacts of said switch means, spring means provided in said chamber and adapted to bias the pressure responsive member to maintain the switch means closed, and a source of pressure in communication with the pressure line and chamber and serving to pressurize the chamber when the tool is extended and the port in said housing is covered to move the pressure responsive member against the pressure of said spring means to open the switch contacts and prevent withdrawal of the workpiece, said port being uncovered upon retraction of the tool clear of the workpiece to relieve the pressure in the chamber whereupon the spring means serves to move the pressure responsive member to close the switch contacts and effect withdrawal of the workpiece.

4. The combination set forth in claim 3 wherein the pressure responsive member comprises a metallic bellows secured to the upper wall of the pressure chamber and having a base portion movable relative to the upper wall of the chamber and connected to the movable contacts of the switch means, and wherein the spring means comprises a coil spring disposed between the upper wall of the chamber and the base portion of the bellows to normally bias the bellows to an extended position and maintain the switch means closed.

5. In combination, conveying means connected in an electrical circuit and adapted to move a workpiece into a work position and withdraw the workpiece from said position, an open-ended housing disposed adjacent to said work position, a tool carrying member slidably disposed within said housing and being movable relative to the housing to move the tool to an extended position in intersecting relation with the workpiece and to a retracted position clear of the workpiece, said housing having a passage through the wall thereof providing a port which is covered when the tool is in the extended position and uncovered when the tool is retracted clear of the workpiece, switch means operably connected in said circuit for controlling the withdrawal of the conveying means together with the workpiece, a pressure line communicating with the passage in said housing, a source of pressure connected to the pressure line, means in said pressure line adjacent said source to regulate the flow of air from the source, a pressure chamber communicating with the pressure line, a pressure responsive element provided in said chamber and adapted to operate the switch means, the pressure from said source serving to pressurize the chamber when the port in said housing is covered to force the pressure responsive element to set the switch means in a position to prevent withdrawal of the workpiece while the tool is extended, said port being uncovered upon retraction of the tool clear of the workpiece to relieve the pressure in the chamber and remove the force on said pressure responsive element whereby the switch means is set to effect withdrawal of the workpiece, and valve means interposed in the pressure line between the port and chamber to control the speed with which the pressure in the chamber is relieved and thereby control the speed of response for operating the switch means.

References Cited in the file of this patent

UNITED STATES PATENTS

| | | |
|---|---|---|
| 1,975,005 | Kingsbury | Sept. 25, 1934 |
| 2,300,457 | Mariotte | Nov. 3, 1942 |
| 2,577,203 | Mariotte | Dec. 4, 1951 |